(12) United States Patent
Chandra et al.

(10) Patent No.: US 10,833,857 B2
(45) Date of Patent: Nov. 10, 2020

(54) ENCRYPTION KEY MANAGEMENT IN A DATA STORAGE SYSTEM COMMUNICATING WITH ASYNCHRONOUS KEY SERVERS

(71) Applicant: INTERNATIONAL BUSINESS MACHINES CORPORATION, Armonk, NY (US)

(72) Inventors: Rashmi Chandra, Santa Clara, CA (US); Jacob L. Sheppard, Corona de Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 277 days.

(21) Appl. No.: 15/882,987

(22) Filed: Jan. 29, 2018

(65) Prior Publication Data
US 2019/0238331 A1    Aug. 1, 2019

(51) Int. Cl.
*H04L 9/08*    (2006.01)

(52) U.S. Cl.
CPC .......... *H04L 9/0894* (2013.01); *H04L 9/0861* (2013.01); *H04L 9/0891* (2013.01)

(58) Field of Classification Search
CPC ... H04L 9/0861; H04L 9/0891; H04L 9/0894; H04L 2209/24; H04L 69/40;
(Continued)

(56) References Cited

U.S. PATENT DOCUMENTS 6,772,337 B1 *   8/2004   Yener .................. H04L 63/0435
                                                         380/279
8,588,425 B1 *  11/2013   Harwood .............. H04L 9/0894
                                                         380/286
(Continued)

FOREIGN PATENT DOCUMENTS

WO   WO-2013022647 A2 *  2/2013   ........... H04L 9/0863
WO   WO-2013121457 A1 *  8/2013   ........... G06F 21/805
WO   WO-2016147567 A1 *  9/2016   ............. G06F 21/62

OTHER PUBLICATIONS

Key Management Interoperability Protocol Specification Version 1.4. Edited by Tony Cox. Nov. 22, 2017. OASIS Standard. http://docs.oasis-open.org/kmip/spec/v1.4/os/kmip-spec-v1.4-os.html.*
(Continued)

*Primary Examiner* — Farid Homayounmehr
*Assistant Examiner* — Lizbeth Torres-Diaz
(74) *Attorney, Agent, or Firm* — William K. Konrad; Konrad Raynes Davda & Victor LLP

(57) ABSTRACT

One general aspect of encryption key management by a data storage controller which communicates with asynchronous key servers is directed to issue a prepare for enable command to request an encryption key from an encryption key server. State machine logic transitions from an unconfigured state to a prepare for enable state in which key server mirror management logic receives from a key server a requested encryption key and caches the received key. In an enabling state, enablement logic verifies successful mirroring of the encryption key by a key server to another key server and
(Continued)

activates the encryption key if key mirroring by key servers is verified. In an enabled state, data is encrypted using the verified, activated encryption key. Other features and aspects may be realized, depending upon the particular application.

24 Claims, 7 Drawing Sheets

(58) Field of Classification Search
CPC ..... H04L 9/0819; H04L 9/08; H04L 41/0663; G06F 21/10; G06F 11/1456; G06F 11/1469
USPC .......................................................... 380/278
See application file for complete search history.

(56) References Cited

U.S. PATENT DOCUMENTS

| | | | |
|---|---|---|---|
| 9,141,814 B1* | 9/2015 | Murray | G06F 11/2046 |
| 9,251,097 B1* | 2/2016 | Kumar | G06F 21/602 |
| 9,288,042 B1 | 3/2016 | Madhukar et al. | |
| 9,300,464 B1 | 3/2016 | Roth | |
| 2005/0086342 A1* | 4/2005 | Burt | H04L 43/0811 |
| | | | 709/224 |
| 2005/0138374 A1* | 6/2005 | Zheng | H04L 9/0894 |
| | | | 713/166 |
| 2007/0127722 A1* | 6/2007 | Lam | H04L 9/0891 |
| | | | 380/277 |
| 2008/0092239 A1* | 4/2008 | Sitrick | H04N 21/4627 |
| | | | 726/27 |
| 2008/0101596 A1* | 5/2008 | Cerruti | G06F 21/602 |
| | | | 380/30 |
| 2008/0104145 A1* | 5/2008 | Lipman | G06F 11/1456 |
| 2008/0148067 A1* | 6/2008 | Sitrick | H04L 9/0891 |
| | | | 713/193 |
| 2009/0202080 A1* | 8/2009 | Mizuno | H04L 9/0833 |
| | | | 380/279 |
| 2010/0054458 A1* | 3/2010 | Schneider | H04L 9/14 |
| | | | 380/28 |
| 2011/0055559 A1* | 3/2011 | Li | H04L 9/0894 |
| | | | 713/165 |
| 2011/0063093 A1* | 3/2011 | Fung | G06Q 10/0875 |
| | | | 340/10.52 |
| 2013/0028414 A1* | 1/2013 | Randell | H04L 9/0894 |
| | | | 380/44 |
| 2013/0145173 A1* | 6/2013 | Shablygin | G06F 21/34 |
| | | | 713/185 |
| 2016/0162693 A1* | 6/2016 | Breuer | G06F 21/602 |
| | | | 713/164 |
| 2018/0097638 A1* | 4/2018 | Haldenby | H04L 9/3247 |
| 2018/0115537 A1* | 4/2018 | Zhu | H04L 9/0894 |
| 2019/0229902 A1* | 7/2019 | Zheng | H04L 9/0822 |
| 2019/0238331 A1* | 8/2019 | Chandra | H04L 9/0861 |
| 2019/0311088 A1* | 10/2019 | Sitrick | H04N 21/4405 |
| 2019/0342096 A1* | 11/2019 | Starosielsky | H04L 63/083 |

OTHER PUBLICATIONS

"Asynchronous encryption key loading to prevent manual intervention in high availability clustered system", IP.com, IP.com Prior Art Database Technical Disclosure, IP.com No. IPCOM000224129D, Dec. 11, 2012, pp. 3.
"Load-balanced Redundant Asynchronous Mirroring Support for Hyperswap", IP.com, IP.com Prior Art Database Technical Disclosure, IP.com No. IPCOM000196358D, Jun. 1, 2010, pp. 3.
"Fujitsu Storage ETERNUS LT Data Encryption and Key Management", Fujitsu Inc., White Paper, Jan. 2016, pp. 7.
"Key Management Interoperability Protocol", Wikipedia, [online][retrieved Apr. 19, 2017] http://en.wikipedia.org/wiki/Key_Management_Interoperability_Protocol, pp. 6.

* cited by examiner

ENCRYPTION KEY MANAGEMENT IN A DATA STORAGE SYSTEM COMMUNICATING WITH ASYNCHRONOUS KEY SERVERS

BACKGROUND OF THE INVENTION

1. Field of the Invention

The present invention relates to a computer program product, system, and method for encryption key management in data storage systems communicating with asynchronous key servers.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Data from a host to be stored in the data storage system is typically directed to a primary data storage device at a local site and then replicated to one or more secondary data storage devices which may be geographically remote from the primary data storage device.

The process of replicating, that is, copying data over to a secondary data storage device can be setup in either a synchronous or asynchronous relationship between the primary data storage device and the secondary data storage device. In a synchronous relationship, any updates to the primary data storage device are typically synchronized with the secondary data storage device, that is, successfully copied over to the secondary data storage device, before the primary data storage system reports to the host that the data storage input/output operation has been successfully completed.

Storage systems may alternatively employ an asynchronous relationship between a primary data storage device and a secondary data storage device, particularly if the secondary data storage device is geographically distant from the primary data storage device. In an asynchronous relationship, successful updates to the primary data storage device are typically reported to the host as a successful storage input/output operation without waiting for the update to be replicated to the secondary data storage device.

To protect data stored by a data storage device, the data is frequently encrypted using an encryption key provided in accordance with a suitable messaging protocol such as, for example, the Key Management Interoperability Protocol (KMIP) which is governed by the OASIS standards body. Technical details can also be found on the official KMIP page (https://www.oasis-open.org/committees/tc_home.php?wg_abbrev=kmip) and wiki (https://wiki.oasisopen.org/kmip). As described therein, KMIP is an extensible communication protocol that defines message formats for the manipulation of cryptographic keys on a key management server. Keys may be created on a server and then retrieved, in accordance with the KMIP or other suitable key management protocol.

It is generally recommended for a key server to replicate the encryption key being used by a data storage device and store copies of the encryption key on various other key servers to ensure availability of the encryption key to encrypt or decrypt data as needed. Thus, if a primary copy of the encryption key stored on a key server is lost due to a hardware or software failure, a copy of the encryption key may be obtained from another key server storing a copy.

Key management communication protocols may permit various techniques for mirroring an encryption key from one key server to another key server to maintain multiple copies of the encryption key to guard against loss of the encryption key due to a hardware or software failure at a single key server. For example, in synchronous key mirroring, a master key server generates an encryption key and then mirrors a copy of the encryption key to other key servers (often referred to as clone key servers) before providing the requested encryption key to the requesting data storage system. In this manner, mirror copies of the encryption key are assured before the requesting data storage system is in position to activate and use the encryption key to encrypt data stored by the data storage system.

However, not all key servers support synchronous key mirroring. Instead, some key servers utilize asynchronous key mirroring in which a generated encryption key is provided directly to the requesting data storage system and mirroring of the encryption key to other key servers generally takes place later after the encryption key is received by the requesting data storage system.

Prior to activating an encryption key received from a key server, and initiating encryption of data using an activated encryption key, the data storage system may attempt to retrieve one or more mirror copies of the encryption key from various clone key servers to verify that the encryption key has been safely mirrored. If mirroring of the encryption key has not been completed at the time of the verification attempt, the verification attempt by the data storage system may fail.

One approach for avoiding failures of verification attempts is to make available to a data storage system, a pool of encryption keys which have already been generated and successfully mirrored to other key servers. Thus, a storage system may obtain a new encryption key from the pool of keys on a key server, and it is ensured that the key supplied to the requesting data storage device has already been successfully mirrored on other key servers. Accordingly, after requesting and receiving the new encryption key, the requesting data storage system may immediately turn around and retrieve a copy of the encryption key from other key servers to verify that the encryption key has been safely mirrored to other key servers.

This pool of keys approach is frequently utilized in connection with asynchronous key mirroring and requires the keys to be generated and verified in advance of a request from a data storage device. Hence, this approach is somewhat inflexible and does not lend itself to generating encryption keys "on-the-fly" that is, as needed. Moreover, should the pool be exhausted, a verified encryption key may not be immediately available when needed.

Another approach for data storage systems which obtain encryption keys from asynchronous key servers, is to permit the user to activate the encryption key and begin encrypting data without first verifying that the encryption key has in fact been successfully mirrored to other key servers. Such an approach runs the risk that should the encryption key be lost or damaged before key mirroring has completed, a mirror copy of the encryption key may not be available for decryption purposes such that data encrypted with the lost key may be lost as well.

Still another approach to reducing verification failures is to limit the type of permissible key servers for use with the requesting data storage systems, to the synchronous key server type since a requested encryption key obtained from a synchronous key server will have been successfully mirrored to other key servers before it is provided to the requesting data storage device. However, if a requesting data storage system obtains the encryption key from a key server on the assumption that the key server is a synchronous key server but in fact the key server is an asynchronous key server, an attempt to verify mirroring of the encryption key by the data storage system may fail as described above.

SUMMARY

Encryption key management in a data storage system communicating with asynchronous key servers, in accordance with one embodiment of the present description, includes obtaining an encryption key from one or more key servers, activating the encryption key, and enabling data encryption using the activated encryption key. Successful mirroring of the encryption key may be verified prior to activation of the encryption key regardless of whether the encryption key server employs automatic key mirroring, for example, or manual key mirroring.

In one aspect of the present description, processor operations of a data storage device for use with an encryption key server and another key server, include issuing a prepare for enable command to request an encryption key from an encryption key server, and in association with the prepare for enable command, transitioning state machine logic from an unconfigured state to a prepare for enable state. In association with the prepare for enable state, upon receiving a requested encryption key, the received encryption key is stored and state machine logic transitions from the prepare for enable state to an enabling state. In association with the enabling state, enablement logic attempts to retrieve a mirror copy of the encryption key from another key server to confirm successful mirroring of the encryption key to another key server, and upon successful retrieval of at least one mirror copy of the encryption key from another key server, activates the encryption key to become an activated encryption key. Data encryption is enabled using the activated encryption key, and the state machine logic transitions from the enabling state to an enabled state in which encryption of data using the activated encryption key has been enabled.

In another aspect, the enablement logic attempting to retrieve a mirror copy of the encryption key from another key server includes periodically polling another key server upon expiration of a polling period, to confirm successful mirroring of the encryption key to the key server being polled. The processor operations may further comprise a human activated enable command and in response to receiving the human activated enable command, initiating polling another key server to confirm successful mirroring of the encryption key to the key server being polled independently of expiration of a polling period.

In still another aspect, the processor operations may further comprise the state machine logic transitioning the state machine logic back to the unconfigured state upon failure to receive a requested encryption key.

Yet another aspect is directed to processor operations issuing a prepare for rekey command to obtain a second encryption key from an encryption key server, and in association with the prepare for rekey command, transitioning state machine logic from the enabled state to a prepare for rekey state. In association with the prepare for rekey state, upon receiving a requested second encryption key, the processor operations include storing the received second encryption key and transitioning state machine logic from the prepare for rekey state to a rekeying state. In association with the rekeying state, the processor operations include enablement logic attempting to retrieve a mirror copy of the second encryption key from another key server to confirm successful mirroring of the second encryption key to another key server. Upon successful retrieval of at least one mirror copy of the second encryption key from another key server, processor operations include activating the second encryption key to become an activated second encryption key, enabling data encryption using the activated second encryption key, and causing state machine logic to transition from the rekeying state to the enabled state in which encryption of data using the activated second encryption key has been enabled.

Yet another aspect of the present description is directed to processor operations in which the enablement logic attempting to retrieve a mirror copy of the second encryption key from another key server includes periodically polling another key server upon expiration of a polling period, to confirm successful mirroring of the second encryption key to the key server being polled.

Another aspect of the present description is directed to processor operations which further include receiving a human activated rekey command and in response to receiving the human activated rekey command, initiating polling another key server to confirm successful mirroring of the second encryption key to the key server being polled independently of expiration of a polling period. In still another aspect, the processor operations further comprise the state machine logic transitioning the state machine logic back to the enabled state in which encryption of data using the activated encryption key has been enabled, but in which encryption of data using the second encryption key is not enabled upon failure to receive a requested second encryption key.

DETAILED DESCRIPTION

Figure 1:
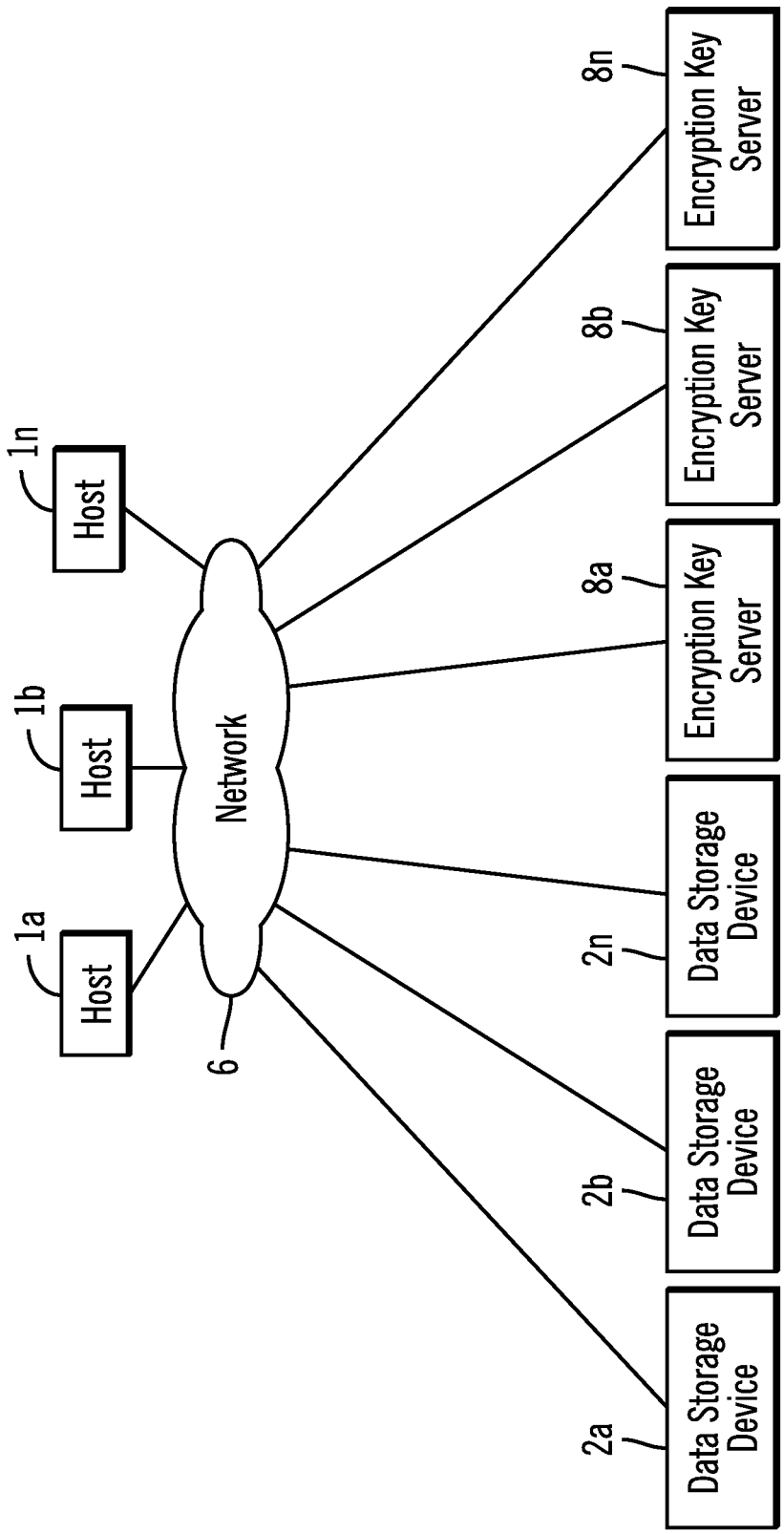
FIG. 1 illustrates an embodiment of a computing environment employing encryption key management in a data storage system which communicates with asynchronous key servers in accordance with one aspect of the present description.

Encryption key management in a data storage system communicating with asynchronous key servers, in accordance with one embodiment of the present description, includes encryption key management logic which performs the function of obtaining an encryption key from one or more key servers, activating the encryption key, and enabling data encryption using the activated encryption key. As explained in greater detail below, successful mirroring of the encryption key may be verified prior to activation of the encryption key regardless of whether the encryption key server employs automatic key mirroring, for example, or manual key mirroring.

In one embodiment, encryption key management logic of a data storage system which communicates with asynchronous key servers includes command logic which selectively issues commands including a "prepare for enable" command to request an encryption key from an encryption key server and an "enable command" to verify mirroring of the encryption key and to enable data encryption using an activated encryption key which has been verified as successfully mirrored. State machine logic of the key management logic has a plurality of states including an "unconfigured' state, a "prepare for enable" state, an "enabling" state and an "enabled" state. In the unconfigured state, encryption has not been enabled and the encryption key is not yet known to the data storage system.

As explained in greater detail below, in the prepare for enable state, an encryption key is requested from a key server. When received, the encryption key may be cached locally by the data storage system. If mirroring of the encryption key by an external key server is automatic, the automatic mirroring of the encryption key to other key servers may be performed while the state machine logic is in the prepare for enable state. Conversely, if automatic mirroring is not available such that manual initiation of mirroring of the encryption key is applicable, the mirroring of the encryption key by the key server to other key servers may be manually initiated while the state machine logic is in the prepare for enable state. Key servers frequently employ a suitable graphical user interface to assist a human user in manually initiating key mirroring between key servers.

In one embodiment of the enabling state, completion of the mirroring of the encryption key to another key server is verified. If mirroring of the encryption key to another key server is successfully verified, the encryption key is activated, data encryption is enabled and in response, the state machine transitions to the enabled state in which data encryption has been enabled.

The state machine logic can transition to different states in response to commands. For example, in response to issuance of the prepare for enable command, the state machine transitions from the unconfigured state to the prepare for enable state in which mirroring of the encryption key, either automatic or manually initiated, takes place. Further, in response to issuance of the enable command, the state machine logic transitions from the prepare for enable state to the enabling state in which mirroring of the encryption key is verified prior to activation and enablement.

Upon successful completion of mirroring by the key servers, at least one other key server stores a mirror copy of the encryption key. To verify key mirroring, the key server mirror management logic causes command logic to issue an enable command which transitions the state machine logic to the enabling state in which mirroring of the encryption key is verified by enablement logic and the encryption key is activated if successful mirroring is verified. Upon successful mirror verification, the enablement logic activates the encryption key and enables encryption such that the state machine logic transitions to the enabled state in which encryption of data using the activated encryption key has been enabled. In one embodiment, encryption key management logic of a data storage system which communicates with asynchronous key servers may further include a user interface logic which provides in an interface to receive manual inputs from a user to facilitate manual operations which may be appropriate in some embodiments of encryption key management for communication with asynchronous key servers in accordance with the present description.

It is appreciated that a retrieval request of a mirrored key which is directed to key server clones that are mirrored asynchronously may not be successful depending upon circumstances, such as if done immediately after receipt of the requested key. However, in encryption key management logic of a data storage system which communicates with asynchronous key servers, in accordance with the present description, a periodic polling operation may optionally be implemented in some embodiments to minimize the amount of time between when mirroring of the encryption key is complete between key servers and when the encryption key management logic state transitions from enabling to enabled.

As explained in greater detail below, encryption key management logic of a data storage system which communicates with asynchronous key servers, in accordance with the present description, may reduce or eliminate chances of loss of the encryption key due to a hardware or software failure of a single key server storing the encryption key provided by a key server employing asynchronous key mirroring. For example, data storage systems may avoid reliance on a single copy of an activated encryption since verification of asynchronous mirrored copies of the encryption key at different key servers is ensured prior to activation of the encryption key.

Still further, encryption key management logic of a data storage system which communicates with asynchronous key servers, in accordance with the present description, may reduce or eliminate verification failures caused by an assumption on the part of a data storage system or operator that key mirroring is synchronous when in fact the key mirroring is asynchronous. Instead, encryption key management logic of a data storage system which communicates with asynchronous key servers, in accordance with the present description, avoids verification failures whether key mirroring is performed automatically by the key servers or manually.

Still further, encryption key management logic of a data storage system which communicates with asynchronous key servers, in accordance with the present description, may reduce or eliminate reliance upon a pool of encryption keys which were generated in advance. For example, encryption key management logic of a data storage system which communicates with asynchronous key servers, in accordance with the present description, may readily utilize a newly generated encryption key which is reliably verified before activation. As such, a fully mirrored encryption key is readily available by requesting a new one from a key server and verifying proper mirroring of the new key prior to activation in accordance with the present description. Other aspects and advantages may be realized, depending upon the particular application.

A system of one or more computers which communicates with asynchronous key servers may be configured for encryption key management in accordance with the present description, by virtue of having software, firmware, hardware, or a combination of them installed on the system that in operation causes or cause the system which communicates with asynchronous key servers to perform encryption key management in accordance with the present description. For example, one or more computer programs which communicate with asynchronous key servers may be configured to perform encryption key management in accordance with the present description by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a copy relationship identifies a source storage location, such as a primary storage location, and a target storage location, such as a secondary storage location, in which data stored at the source storage location is to be replicated or otherwise copied to the target storage location. Thus, as used herein, a source storage location and a target storage location are storage locations related by a copy relationship.

Furthermore, as used herein, the term "storage unit" refers to a storage location containing one or more units of data storage such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

Implementations of the described techniques may include hardware, a method or process, or computer software on a computer-accessible medium. FIG. 1 illustrates an embodiment of a data storage system computing environment employing encryption key management for communication with asynchronous key servers, in accordance with the present description. A plurality of hosts 1a, 1b . . . 1n may submit Input/Output (I/O) requests to one or more data storage systems 2a, 2b, 2n over a network 6 to access data stored by the data storage systems. Each data storage system 2a, 2b, 2n may obtain an encryption key over a network 6 from a key server 8a, 8b . . . 8n, for purposes of data encryption and decryption by the data storage system. The hosts 1a, 1b . . . 1n may be separate physical devices or may be virtual devices implemented using assigned resources of partitions of a server, for example. In a similar manner, the data storage systems 2a, 2b . . . 2n and the key servers 8a, 8b . . . 8n may be separate physical devices or may be virtual devices implemented using assigned resources of partitions one or more servers, for example.

A key server which provides the original encryption key in response to a request from a data storage system, is often referred to as the master key server. A copy of the encryption key is typically mirrored to other key servers to store copies of the encryption key for safe keeping. The key servers storing the copies of the encryption key are typically referred to as clone or peer key servers.

Figure 2:
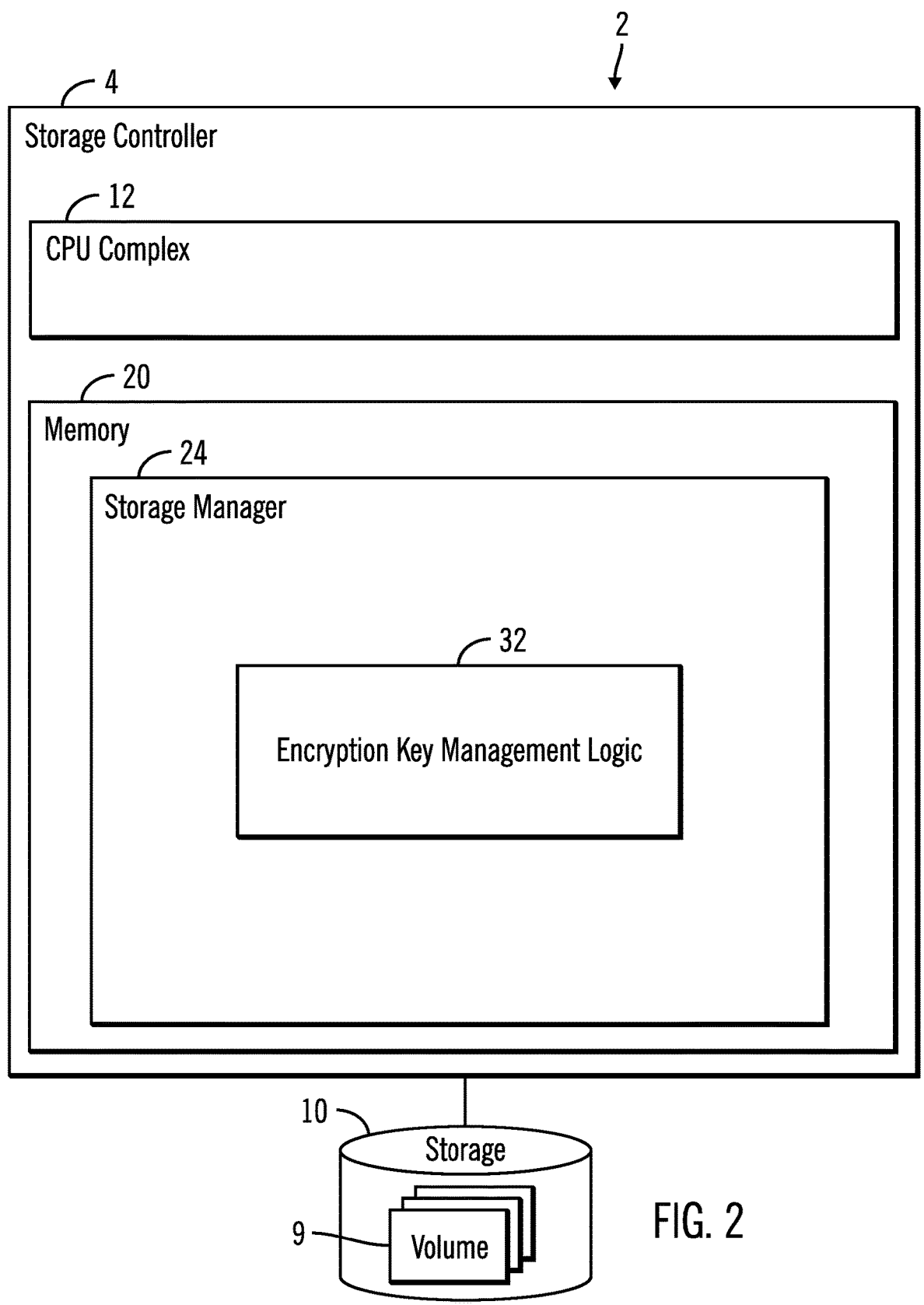
FIG. 2 illustrates an example of a data storage system which communicates with asynchronous key servers, employing encryption key management in accordance with one aspect of the present description.
Figure 3:
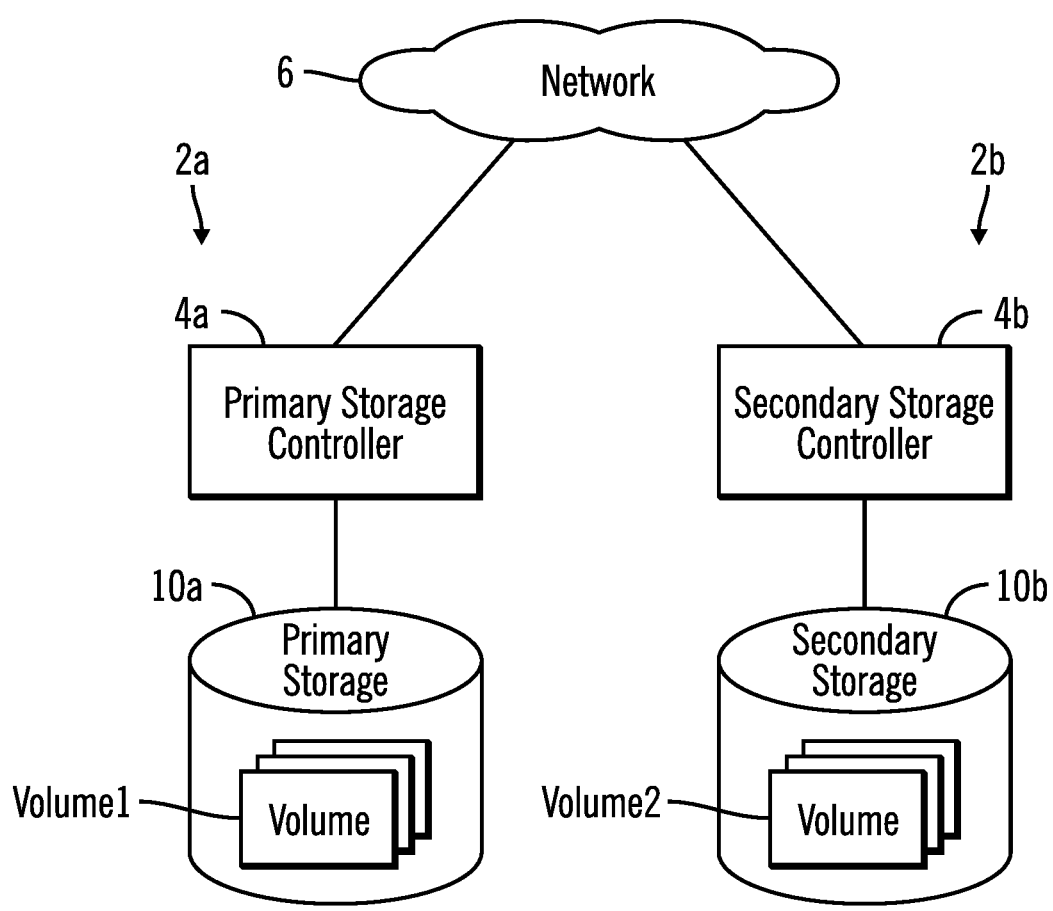
FIG. 3 illustrates an example of a storage system which communicates with asynchronous key servers, having a primary data storage system and a secondary data storage system, employing encryption key management in accordance with one aspect of the present description.

FIG. 2 shows in greater detail an example of a data storage system 2 employing asynchronous encryption key management for communication with asynchronous key servers 8a, 8b . . . 8n, in accordance with the present description. The data storage system 2 is similar to and representative of the data storage systems 2a, 2b . . . 2n (FIG. 1). FIG. 3 illustrates an example of a storage system having a primary data storage system 2a and a secondary data storage system 2b, in which one or both of the primary or secondary storage systems employ encryption key management for communication with asynchronous key servers 8a, 8b . . . 8n, in accordance with one aspect of the present description.

Each data storage system 2 (FIG. 2), 2a, 2b . . . 2n (FIG. 1) includes a storage controller or control unit 4 (FIG. 2), 4a (FIG. 3), 4b which accesses data at volumes 9 (FIG. 2), volume1, volume2 (FIG. 3) (e.g., LUNs (Logical Units), Logical Devices, Logical Subsystems, etc.) in storage represented by one or more storage drives 10 (FIG. 2), 10a, (FIG. 3), 10b (FIG. 3). Each storage controller 4, 4a, 4b includes a CPU complex 12 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 3), 4b further has a memory 20 (FIG. 2) that includes a storage manager 24 for managing storage operations including writing data to or reading data from an associated storage 10, 10a (FIG. 3), 10b, respectively, in response to an I/O data request from a host. The storage operations managed by the storage manager 24 further include data replication operations from a primary volume1 (FIG. 3) of a primary data storage system such as the data storage system 2a, for example, to a secondary volume2 at a secondary data storage system such as the data storage system 2b, for example. The storage manager 24 is configured to generate copies of the primary volume1 (FIG. 3) of the primary data storage system 2a as a secondary volume2 (FIG. 3) of the secondary data storage system 2b. The pair of volumes, volume1, volume2 are in a copy relationship such that updates to the primary volume1 are replicated to the secondary volume2.

As described in greater detail below, key management for communication with key server logic 32 of the storage manager 24 facilitates management of communication with key servers 8a, 8b . . . 8n to obtain encryption keys from and verify mirroring of encryption keys between key servers 8a, 8b . . . 8n, for reliable data encryption and decryption in embodiments in which the key server providing the encryption key is an asynchronous key server, for example. In the illustrated embodiment, the storage manager 24 including the key management for communication with key server logic 32, is depicted as software stored in the memory 20 and executed by the CPU complex 12. However, it is appreciated that the logic functions of the storage manager 24 may be implemented as hardware, software, firmware or combinations of one or more thereof, depending upon the particular application.

In one embodiment, the storage drives 10, 10a, 10b may be comprised of one or more sequential access storage devices, such as hard disk drives and magnetic tape or may include non-sequential access storage devices such as solid state drives (SSD), for example. Each storage drive 10, 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The system components 1a, 1b . . . 1n, 4, 4a, 4b, 10, 10a, 10b are connected to the network 6 which enables communication among these components. Thus, the network 6 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
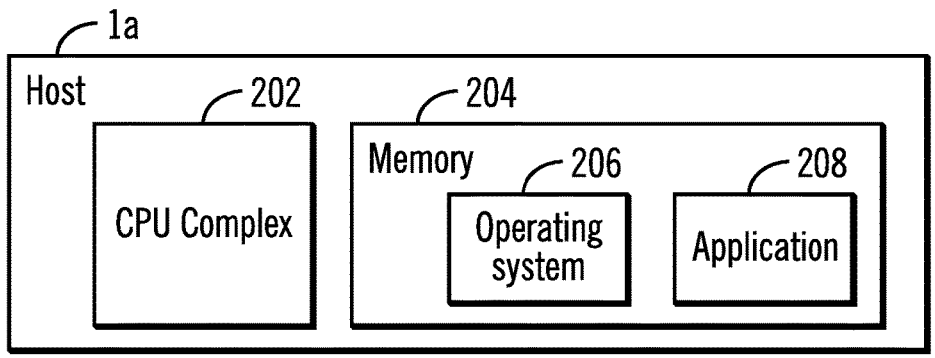
FIG. 4 illustrates an example of a host in the computing environment of FIG. 1.

A typical host as represented by the host 1a of FIG. 4 includes a CPU complex 202 and a memory 204 having an operating system 206 and an application 208 that cooperate to read data from and write data updates to the primary storage 10a (FIG. 3) or secondary storage 10b via a storage controller 4a, 4b. An example of a suitable operating system is the z/OS operating system. It is appreciated that other types of operating systems may be employed, depending upon the particular application.

Figure 5:
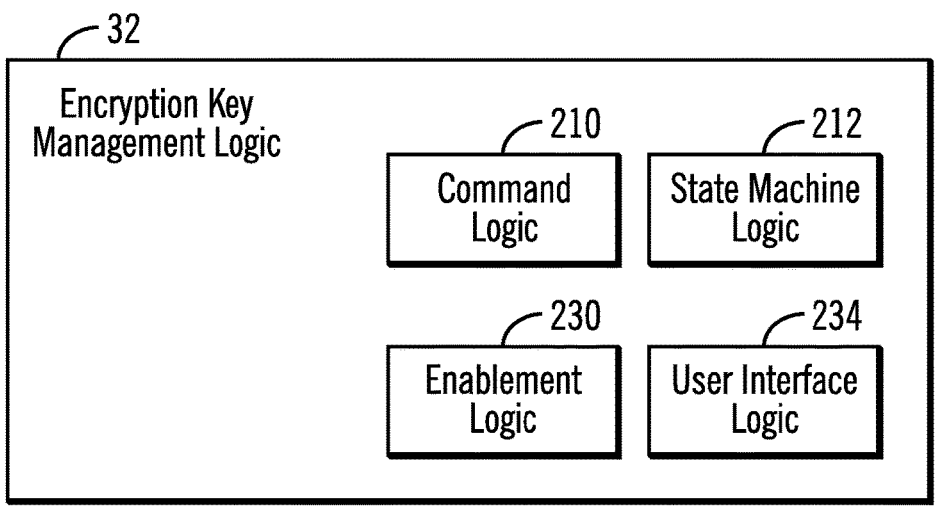
FIG. 5 illustrates an example of encryption key management logic in a data storage system which communicates with asynchronous key servers in accordance with one aspect of the present description.
Figure 6:
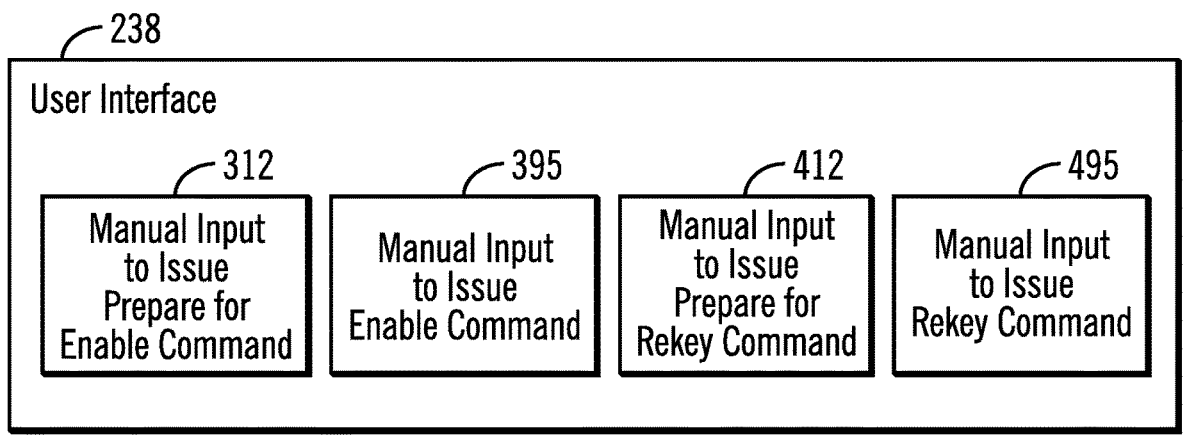
FIG. 6 depicts an example of a user interface for the encryption key management logic of FIG. 5 in a data storage system which communicates with asynchronous key servers, in accordance with one aspect of the present description.

FIGS. 5 and 6 depicts one embodiment of the encryption key management logic 32 of a data storage system 2 (FIG. 2), 2a (FIG. 3), 2b which communicates with asynchronous key servers in greater detail. In this embodiment, the encryption key management logic 32 (FIG. 5) is configured to perform the function of obtaining an encryption key from one or more asynchronous key servers 8a (FIG. 1), 8b, 8n, to verify mirroring by the asynchronous key servers 8a, 8b . . . 8n, to activate the verified encryption key and to enable data encryption using the activated encryption key. The encryption key management logic 32 (FIG. 5) includes command logic 210 configured to selectively issue commands including a "prepare for enable" command to request an encryption key from an asynchronous key server 8a (FIG. 1), 8b, 8n, and an "enable command" to verify mirroring of the encryption key prior to activation of a verified key and enablement of data encryption using an activated encryption key.

The encryption key management logic 32 (FIG. 5) of a data storage system which communicates with asynchronous key servers further includes state machine logic 212 having in one embodiment, a plurality of states including an "unconfigured" state 214 (FIG. 7), a "prepare for enable" state 218, an "enabling" state 222 and an "enabled" state 224. In the unconfigured state 214, encryption has not been enabled and the encryption key is not known to the data storage system.

In the prepare for enable state 218, the encryption key has been requested from a key server. When received, the encryption key may be cached locally by the data storage system. If mirroring of the encryption key by an external key server of the key servers 8a, 8b . . . 8n is automatic, the automatic mirroring of the encryption key by a key server to other key servers 8a, 8b . . . 8n may be performed while the state machine logic 212 is in the prepare for enable state 218. Conversely, if automatic mirroring is not available such that human intervention to initiate mirroring of the encryption key between key server clones is necessary, the mirroring of the encryption key by a key server to other key servers may be manually initiated while the state machine logic 212 is in the prepare for enable state 218. It is appreciated that in some embodiments, completion of mirroring of the encryption key between key servers 8a, 8b . . . 8n, may be completed by the key servers after the state machine of the key management for communication with key server logic 32 has advanced to the enabling state 222. Also, in other embodiments, key mirroring by the key servers may be initiated and completed by the key servers while the state machine logic 212 is in the enabling state 222.

In the enabling state 222, completion of the mirroring of the encryption key by one key server to other key servers is verified. If mirroring of the encryption key to other key servers is successfully verified, the encryption key is activated, and data encryption is enabled. In response, the state machine logic 212 transitions to the enabled state 224 in which data encryption has been enabled for the verified, activated encryption key.

The state machine logic 212 (FIG. 5) is configured to, in association with issuance of the prepare for enable command by the command logic 210, transition the key management state machine logic 212 from the unconfigured state 214 (FIG. 7) to the prepare for enable state 218 of the key management state machine logic 212. The state machine logic 212 is further configured to and in association with issuance of the enable command, transition the state machine logic from the prepare for enable state to the enabling state 222 of the state machine.

Upon successful completion of mirroring, at least one other key server stores a mirror copy of the encryption key. Accordingly, the encryption key management logic 32 of a data storage system which communicates with asynchronous key servers is further configured to cause the command logic 210 to issue an enable command which transitions the state machine logic 212 to the enabling state 222 (FIG. 7) in which mirroring of the encryption key is verified and the encryption key is activated if successful mirroring is verified. Upon activation of an encryption key which has been verified as successfully mirrored between key servers, data encryption is enabled and in response, the state machine logic 212 transitions the state machine to the enabled state 224 in which data encryption has been enabled using a verified, activated encryption key.

Accordingly, enablement logic 230 (FIG. 5) of the encryption key management logic 32 of a data storage system which communicates with asynchronous key servers is configured to, in association with the enabling state 222 (FIG. 7), and in response to an enable command, attempt to retrieve from a clone key server, a mirror copy of the encryption key from a key server of the clone key server, to confirm successful mirroring of the encryption key to another key server, and upon successful retrieval of at least one mirror copy of the encryption key from a key server of a clone key server, activate the encryption key to become an activated encryption key. Upon successful mirror verification and activation of the encryption key, the enablement logic 230 (FIG. 5) is configured to enable encryption of data using the activated encryption key. In response to the enabling of data encryption, the state machine logic 212 is configured to transition to the enabled state 224 in which encryption of data using the verified, activated encryption key has been enabled. The encryption key management logic 32 of a data storage system which communicates with asynchronous key servers may further include a user interface logic 234 which provides a human user interface 238 (FIG. 6) to receive inputs from a human user to facilitate manual operations which may be appropriate in some embodiments of encryption key management in accordance with the present description.

Figure 7:
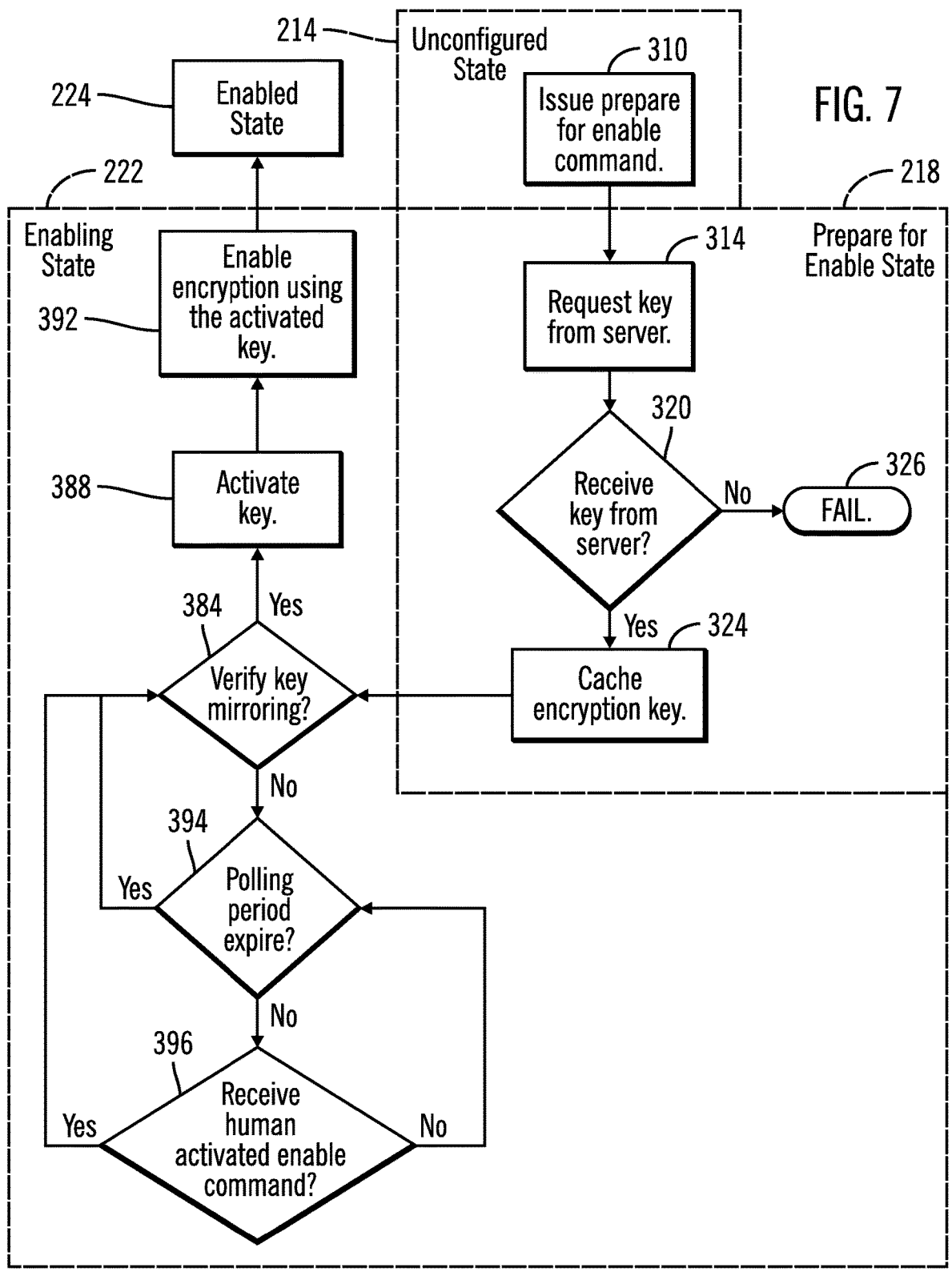
FIG. 7 depicts an example of operations of the encryption key management logic of FIG. 5 in a data storage system which communicates with asynchronous key servers, in accordance with one aspect of the present description.

FIG. 7 depicts one example of operations of the encryption key management logic 32 of a data storage system which communicates with asynchronous key servers, in accordance with one embodiment of the present description. Starting in the unconfigured state 214 of the state machine logic 212, in which encryption has not been enabled and the encryption key is not known to the data storage system, a prepare for enable command is issued (block 310, FIG. 7). As set forth above, FIG. 6 depicts an example of a user interface 238 provided by the user interface logic 234 (FIG. 5). The user interface 238 includes an input 312 by which a human user may manually cause the command logic 210 (FIG. 5) to issue (block 310, FIG. 7) a prepare for enable command as described above. Alternatively, the encryption key management logic 32 of a data storage system which communicates with asynchronous key servers may be configured to cause the command logic 210 (FIG. 5) to automatically issue (block 310, FIG. 7) the prepare for enable command in connection with a suitable event such as start-up operations of the data storage system in which data encryption is selected.

In response to issuance (block 310, FIG. 7) of the prepare for enable command by the command logic 210, the state machine logic 212 transitions from the unconfigured state 214 to the prepare for enable state 218 of the state machine logic 212. In association with the prepare for enable state 218, the encryption key management logic 32 of a data storage system which communicates with asynchronous key servers is configured to trigger, in response to the prepare for enable command, a request (block 314, FIG. 7) for an encryption key from a master key server of the key servers 8a, 8b . . . 8n (FIG. 1). The encryption key management logic 32 of a data storage system which communicates with asynchronous key servers is further configured to determine (block 320, FIG. 7) whether the requested encryption key has been received and if so, to cache (block 324) locally the received encryption key. Failure to receive an encryption key in response to the request 314 causes in one embodiment, a fail 326. In one embodiment, a fail 326 may result in the state machine transitioning back to the unconfigured state 214.

As noted above, if mirroring of the encryption key by an external key server of the key servers 8a, 8b . . . 8n is automatic, the automatic mirroring of the encryption key to other key servers 8a, 8b . . . 8n may be performed while the state machine logic 212 is in the prepare for enable state 218. Conversely, if automatic mirroring is not available such that human intervention to initiate mirroring of the encryption key between key server clones is necessary, the mirroring of the encryption key to other key servers may be manually initiated using a suitable key server interface, while the state machine logic 212 is in the prepare for enable state 218. Upon completion of mirroring by the key servers, at least one key server in addition to the master key server stores a mirror copy of the encryption key. It is appreciated that in some embodiments, completion of mirroring of the encryption key between key servers 8a, 8b . . . 8n, may be completed by the key servers after the state machine of the encryption key management logic 32 has advanced to the enabling state 222 described below.

Having cached (block 324) the received encryption key, encryption key management logic 32 (FIG. 5) causes the command logic 210 to issue an enable command which transitions the state machine logic 212 to the enabling state 222. In the enabling state 222, the enablement logic 230 performs operations including verifying (block 384) mirroring of the encryption key, activating (block 388) the encryption key if successful key mirroring is verified, and enabling (block 392) data encryption using an activated encryption key. In response, the state machine logic 212 transitions the state machine to the enabled state 224 in which data encryption using the verified and activated encryption key has been enabled.

Accordingly, in response to the enable command and in association with the enabling state 222, the enablement logic 230 (FIG. 5) of the encryption key management logic 32, verifies (block 384) successful mirroring of the encryption key by the master key server to clone servers by attempting to retrieve from one or more clone key servers, a mirror copy of the encryption key. In the illustrated embodiment, verification of key mirroring is performed using a periodic polling function. If an attempt to verify (block 384) key mirroring by polling key servers is not successful, a polling period may be timed and upon expiration (block 394) of the polling period, the key servers may be polled again (block 384) to verify whether key mirroring has been successfully completed. Upon successful retrieval of at least one mirror copy of the encryption key from a clone key server, the enablement logic 230 (FIG. 5) in the enabling state 222, activates (block 388) the encryption key to become an activated encryption key, and enables (block 392) encryption of data in the data storage system using the activated encryption key. In response to the enabling of data encryption by the enablement logic 230, the state machine logic 212 transitions to the enabled state 224 in which data encryption using the verified, activated encryption key, has been enabled. It is further appreciated that in some embodiments, mirroring of the encryption key between key servers 8a, 8b . . . 8n, may be automatically or manually initiated with the key servers after the state machine of the encryption key management logic 32 has advanced to the enabling state 222. As noted above, key servers frequently employ a graphical user interface to facilitate manually initiating in response to a manual input by a human, mirroring of encryption keys between key servers should automatic mirroring of encryption keys between key servers not be available. Thus, in the embodiment of FIG. 7, a human user may optionally use such a graphical user interface of a key server to, for example, check on the status of the key mirroring and control the key mirroring process of the key servers as needed to initiate or complete the key mirroring process. Upon noting completion of the key mirroring process by the key servers, the human user may utilize the user interface 238 (FIG. 6) of the encryption key management logic 32, to trigger a manual input 395 to cause the command logic 210 to issue an enable command. In response (block 396) to the human activated enable command, the enablement logic 230 can in one embodiment initiate (block 384) an immediate polling of the key servers to verify the successful mirroring of the encryption key, independently of the polling period, that is, without waiting for the polling period to expire (block 394).

As noted above, in one embodiment, the state machine logic 212 may be further configured to transition the state of the state machine logic back to the unconfigured state 214 upon a failure to receive (block 320) a requested encryption key in the prepare for enable state 218. Similarly, the state machine logic 212 may be further configured to transition the state of the state machine logic back to the unconfigured state 214 upon a failure to verify (block 384) that the encryption key has been successfully mirrored to at least one other key server, after a predetermined number of verification attempts or after a predetermined verification time limit longer than the polling period, has expired. In another embodiment, polling (blocks 384, 394) may continue without predetermined limits by the enablement logic 230 in the enabling state 222 until verification of successful key mirroring is obtained.

In another aspect of the present description, the encryption key management logic 32 (FIG. 5) may be further configured to manage rekeying in which an additional or substitute encryption key is obtained for purposes of encryption or re-encryption of data of a data storage system using an activated additional encryption key. Thus, the encryption key management logic 32 is further configured to manage obtaining an additional encryption key from one or more of the key servers 8a (FIG. 1), 8b, 8n, to activate the additional encryption key upon verifying that the additional key has been properly mirrored to clone key servers, and to enable data encryption using the activated additional encryption key. Accordingly, the command logic 210 of the encryption key management logic 32 is further configured to selectively issue commands including a "prepare for rekey" command to request an additional encryption key from an encryption key server 8a (FIG. 1), 8b, 8n, and to selectively issue a "rekey command" to verify mirroring of the additional encryption key prior to activation of a verified additional key and enablement of data encryption using an activated additional encryption key.

The state machine logic 212 (FIG. 5) in this embodiment, has a plurality of additional states including a "prepare for rekey" state 404 (FIG. 8) and a "rekeying" state 408. In the enabled state 224 discussed above, encryption using the additional encryption key has not been enabled and the additional encryption key is not known to the data storage system.

In the prepare for rekey state 404, the additional encryption key is requested from a key server. When received, the additional encryption key may be cached locally by the data storage system. If mirroring of the additional encryption key by the master key server is automatic, mirroring of the additional encryption key by the master key server to other key servers 8a, 8b . . . 8n may be automatically performed by the master key server while the state machine logic 212 is in the prepare for rekey state 404. Conversely, if automatic mirroring is not available such that human intervention to initiate mirroring of the additional encryption key between key server clones is necessary, the mirroring of the additional encryption key to other key servers may be manually initiated while the state machine logic 212 is in the prepare for rekey state 404. It is appreciated that in some embodiments, completion of mirroring of the additional encryption key between key servers 8a, 8b . . . 8n may be completed by the key servers after the state machine of the encryption key management logic 32 has advanced to the rekeying state 408.

In the rekeying state 408, completion of the mirroring of the additional encryption key to other key servers is verified. If mirroring of the additional encryption key to other key servers is successfully verified, the additional encryption key is activated, and data encryption is enabled for the additional key. In response, the state machine logic 212 transitions to the enabled state 224 in which data encryption has been enabled using the additional encryption key.

The state machine logic 212 is configured to, in association with issuance of the prepare for rekey command by the command logic 210, transition the state of the state machine logic 212 from the enabled state 224 to the prepare for rekey state 404 of the key management state machine logic 212. The state machine logic 212 is further configured to and in association with issuance of the rekey command, transition the state of the state machine logic 212 from the prepare for rekey state 404 to the rekeying state 408 of the key management state machine.

Figure 8:
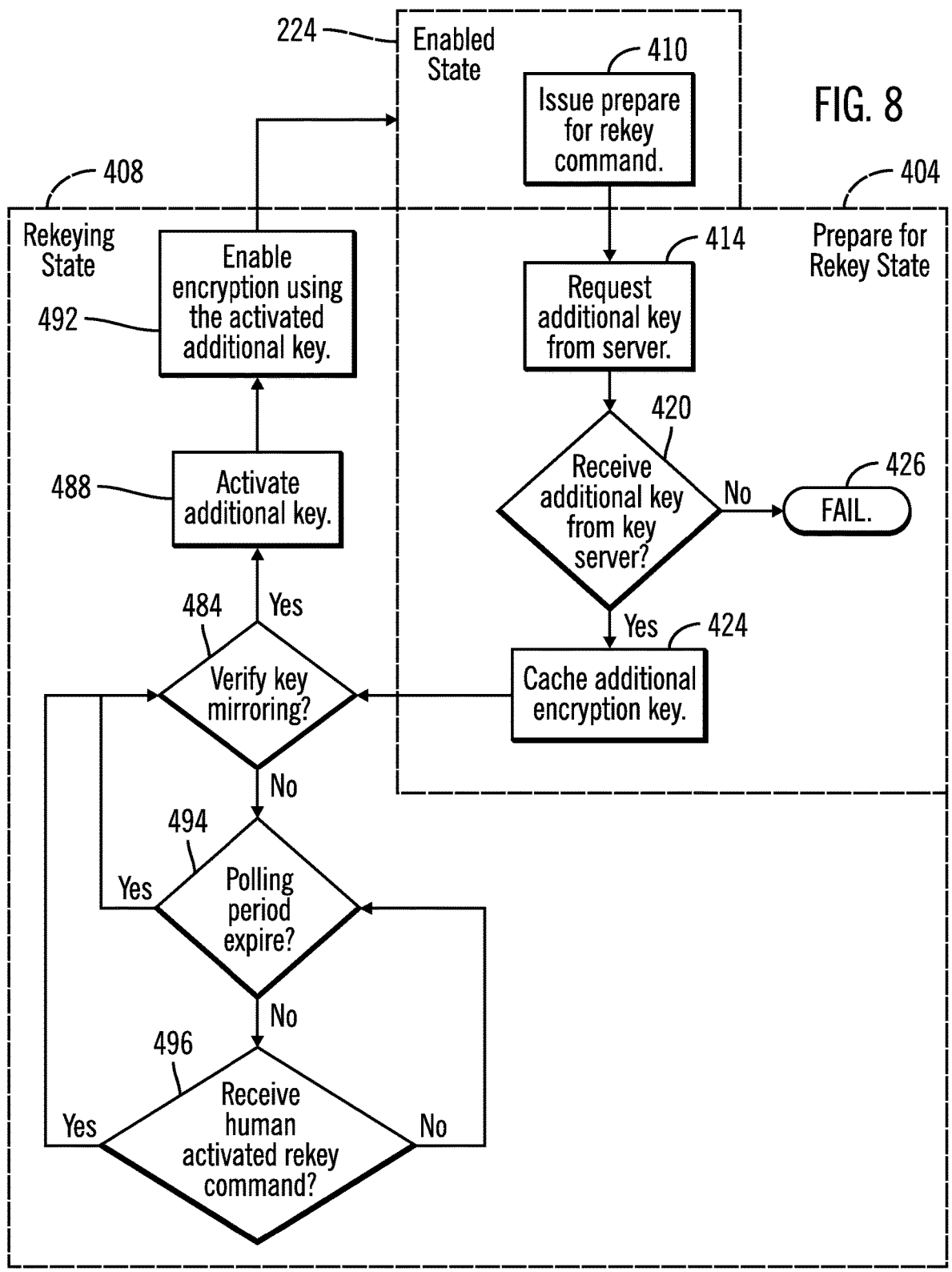
FIG. 8 depicts another example of operations of the encryption key management logic of FIG. 5 in a data storage system which communicates with asynchronous key servers, in accordance with one aspect of the present description.

Upon successful completion of mirroring, at least one other key server stores a mirror copy of the additional encryption key. The encryption key management logic 32 of a data storage system which communicates with asynchronous key servers is further configured to cause the command logic 210 to issue a rekey command which transitions the state of the state machine logic 212 to the rekeying state 408 (FIG. 8). In the rekeying state 408, mirroring of the additional encryption key is verified, the additional encryption key is activated if successful mirroring is verified. Upon activation of an additional encryption key which has been verified as successfully mirrored between key servers, data encryption is enabled for the additional key, and in response, the state machine logic 212 transitions the state machine to the enabled state 224 in which data encryption has been enabled for the activated additional encryption key.

Accordingly, enablement logic 230 of the encryption key management logic 32, is further configured to, in association with the keying state 408, and in response to a rekey command, retrieve from a clone key server, a mirror copy of the additional encryption key from a key server of the clone key server to confirm successful mirroring of the additional encryption key to the key server of the clone key server. Upon successful retrieval of at least one mirror copy of the additional encryption key from a key server of a clone key server, the enablement logic 230 is further configured to activate the additional encryption key to become an activated additional encryption key. Upon successful mirror verification and activation of the additional encryption key, the enablement logic 230 (FIG. 5) is configured to enable data encryption using the verified, activated additional encryption key. In response, the state machine logic transitions the state machine to the enabled state 224, in which encryption of data using the verified, activated additional encryption key has been enabled.

FIG. 8 depicts another example of operations of the encryption key management logic 32 in accordance with the present description. This embodiment is directed to obtaining a new, that is, additional encryption key, referred to herein as rekey management. Starting in the enabled state 224 of the state machine logic 212, in which encryption has previously been enabled for a prior verified and activated encryption key and the additional encryption key is not yet known to the data storage system, a prepare for rekey command is issued (block 410, FIG. 8). FIG. 6 depicts an example of a user interface 238 provided by the user interface logic 234 (FIG. 5) which includes an input 412 by which a user may manually cause the command logic 210 (FIG. 5) to issue (block 410, FIG. 8) a prepare for rekey command. Alternatively, the encryption key management logic 32 may be configured to cause the command logic 210 (FIG. 5) to automatically issue (block 410, FIG. 8) the prepare for rekey command in connection with a suitable event such as start-up operations of the data storage system for another set of data in which data encryption is selected.

In response to issuance (block 410, FIG. 8) of the prepare for rekey command by the command logic 210, the state machine logic 212 transitions from the enabled state 224 to the prepare for rekey state 404 of the state machine logic 212. In association with the prepare for rekey state 404, the encryption key management logic 32 is configured to trigger, in response to the prepare for rekey command, a request (block 414, FIG. 8) for an additional encryption key from a master key server of the key servers 8a, 8b . . . 8n (FIG. 1), and to determine (block 420, FIG. 8) whether the requested additional encryption key has been received. If so, the received additional key is cached (block 424) locally. Failure to receive an encryption key in response to the request 414 causes in one embodiment, a fail 426. In one embodiment, a fail 426 may result in the state machine transitioning back to the unconfigured state 214.

As noted above, if mirroring of the encryption key by an external key server of the key servers 8a, 8b . . . 8n is automatic, the automatic mirroring of the additional encryption key to other key servers 8a, 8b . . . 8n may be performed while the state machine logic 212 is in the prepare for rekey state 404. Conversely, if automatic mirroring is not available such that human intervention to initiate mirroring of the additional encryption key between key server clones is necessary, the mirroring of the additional encryption key by a key server to other key servers may be manually initiated while the state machine logic 212 is in the prepare for rekey state 404. Upon completion of mirroring by the key servers, at least one key server in addition to the master key server stores a mirror copy of the additional encryption key. It is appreciated that in some embodiments, completion of mirroring of the additional encryption key between key servers 8a, 8b . . . 8n, may be completed by the key servers after the state machine of the encryption key management logic 32 has advanced to the rekeying state 408 described below.

Having cached (block 424) the received additional encryption key, encryption key management logic 32 (FIG. 5) causes the command logic 210 to issue a rekey command. The rekey command transitions the state machine logic 212 to the rekeying state 408 in which mirroring of the additional encryption key is verified (block 484), the additional encryption key is activated (block 488) if successful mirroring is verified (block 484), and data encryption is enabled (block 492) to use a verified, activated additional encryption key. In response, the state machine logic 212 transitions the state machine to the enabled state 224.

Accordingly, in response to the rekey command and in association with the rekeying state 408, the enablement logic 230 (FIG. 5) of the encryption key management logic 32, verifies (block 484) successful mirroring of the additional encryption key to clone servers by attempting to retrieve from key servers of one or more clone key servers, a mirror copy of the additional encryption key. In the illustrated embodiment, verification of key mirroring of the additional key is performed using a periodic polling function in a manner similar to that described above in connection with FIG. 7. Thus, if an attempt to verify (block 484) key mirroring by polling key servers is not successful, a polling period may be timed and upon expiration (block 494) of the polling period, the key servers may be polled again (block 484) to verify whether key mirroring has been successfully completed. Upon successful retrieval of at least one mirror copy of the additional encryption key from a key server of a clone key server, the enablement logic 230 (FIG. 5) in the rekeying state 408, activates (block 488) the additional encryption key to become an activated additional encryption key, and enables (block 492) encryption of data in the data storage device using the verified, activated additional encryption key. In response to the enabling of data encryption by the enablement logic 230, the state machine logic 212 transitions the state machine to the enabled state 224 in which data encryption using the verified, activated additional encryption key has been enabled. It is further appreciated that in some embodiments, mirroring of the additional encryption key between key servers 8a, 8b . . . 8n, may be automatically or manually initiated by the key servers after the state machine of the encryption key management logic 32 has advanced to the rekeying state 408. As noted above, key servers frequently employ a graphical user interface to facilitate initiating, in response to a manual input by a human, mirroring of encryption keys between key servers should automatic mirroring of encryption keys between key servers not be available. Thus, in the embodiment of FIG. 8, a human user may optionally use such a graphical user interface of a key server to, for example, check on the status of the key mirroring and control the key mirroring process of the key servers as needed to initiate or complete the key mirroring process for the additional key. Upon noting completion of the key mirroring process by the key servers, the human user may utilize the user interface 238 (FIG. 6) of the encryption key management logic 32, to input through the input 495 of the user interface 238 (FIG. 6), a manual input to cause the command logic 210 to issue a rekey command. In response (block 496) to the human activated rekey command, the enablement logic 230 can in one embodiment initiate (block 484) an immediate polling of the key servers to verify the successful mirroring of the additional encryption key, independently of the polling period, that is, without waiting for the polling period to expire (block 494).

As noted above, in one embodiment, the state machine logic 212 may be further configured to transition the state of the state machine logic back to the enabled state 224 upon a failure to receive (block 420) a requested second encryption key in the prepare for rekey state 404. Similarly, the state machine logic 212 may be further configured to transition the state of the state machine logic back to the enabled state 224 upon a failure to verify (block 484) that the second encryption key has been successfully mirrored to at least one other key server, after a predetermined number of verification attempts or after a predetermined verification time limit longer than the polling period, has expired. In the enabled state 224 following such failures, data encryption using a verified, activated encryption key remains enabled but data encryption using a nonverified, nonactivated additional key is not enabled. In another embodiment, polling (blocks 484, 494) may continue without predetermined limits by the enablement logic 230 in the rekeying state 408 until verification of successful key mirroring is obtained.

A data storage device employing encryption key management in accordance with the present description, may reduce or eliminate chances of loss of the encryption key due to a hardware or software failure of a single key server storing the encryption key provided by a key server employing asynchronous key mirroring. For example, prior data storage devices not employing encryption key management in accordance with the present description, may suffer loss of the only copy of an activated encryption key if the loss occurs prior to completion of an asynchronous mirroring operation. By comparison, data storage devices communicating with asynchronous key servers employing encryption key management in accordance with the present description, may avoid reliance on a single copy of an activated encryption key since mirrored copies of the encryption key at different asynchronous key servers may be verified (block 384, FIG. 7; block 484, FIG. 8) prior to activation (block 388, FIG. 7; block 488, FIG. 8) of the encryption key.

Still further, a data storage device communicating with asynchronous key servers employing encryption key management in accordance with the present description, may reduce or eliminate verification failures caused by an assumption on the part of a data storage device or its operator that key mirroring is synchronous when in fact the key mirroring is asynchronous. Instead, a data storage device communicating with asynchronous key servers employing encryption key management in accordance with the present description, verifies (block 384, FIG. 7; block 484, FIG. 8) mirroring of the key prior to activation (block 388, FIG. 7; block 488, FIG. 8) of the encryption key independently of the manner in which key mirroring is performed.

Still further, a data storage device communicating with asynchronous key servers employing encryption key management in accordance with the present description, may reduce or eliminate verification failures caused by an assumption on the part of a data storage device or its operator that key mirroring is synchronous when in fact the key mirroring is asynchronous. Instead, a data storage device communicating with asynchronous key servers employing encryption key management in accordance with the present description, verifies (block 384, FIG. 7; block 484, FIG. 8) mirroring of the key prior to activation (block 388, FIG. 7; block 488, FIG. 8) of the encryption key independently of the manner in which key mirroring is performed. As such, a fully mirrored encryption key is always readily available by generating a new one and verifying prior to activation in accordance with the present description. It is appreciated that other features may be realized, depending upon the particular application.

Figure 9:
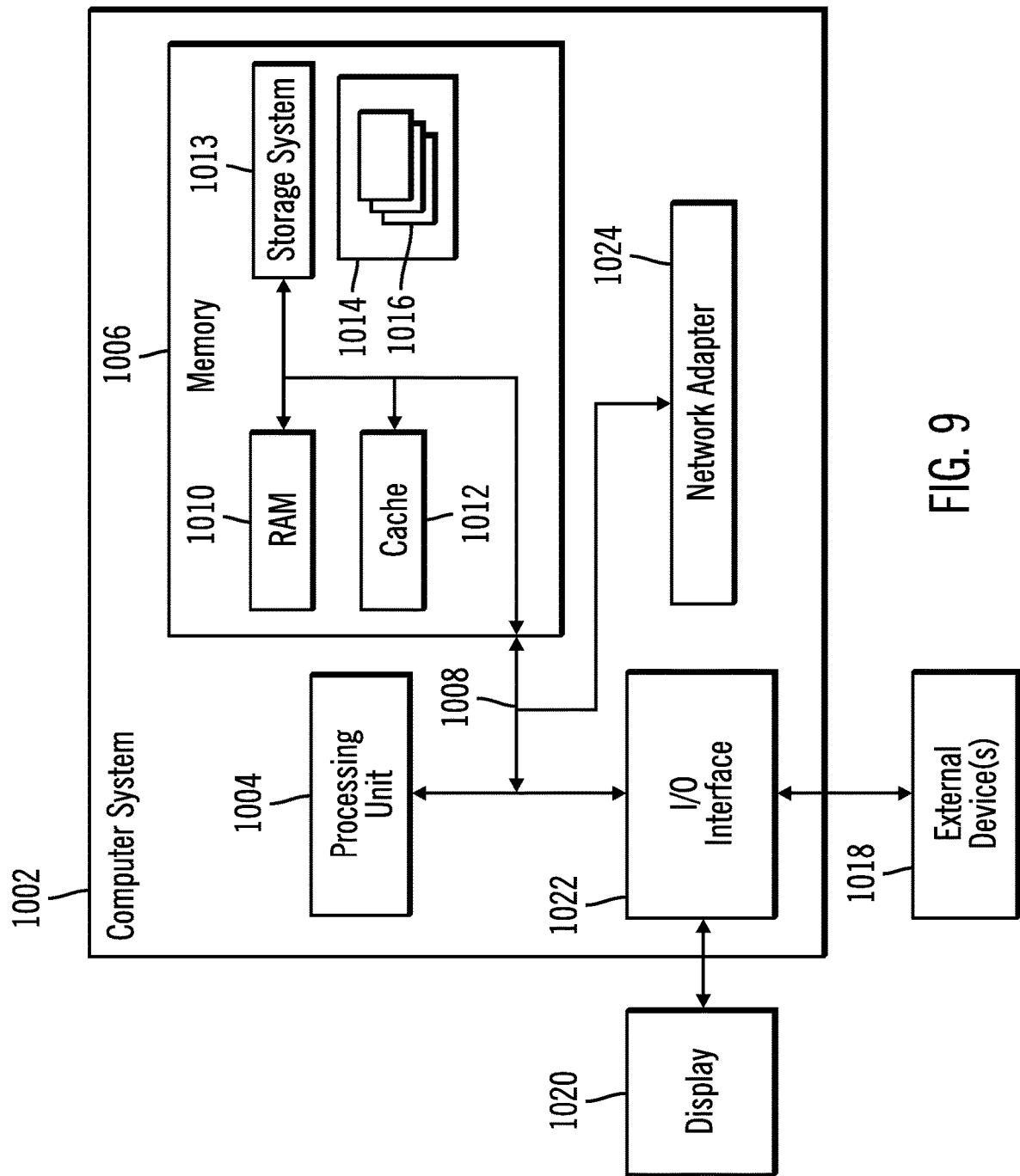
FIG. 9 illustrates a computer embodiment employing encryption key management in a data storage system communicating with asynchronous key servers, in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a data storage device, an encryption key server and another key server, each configured to store an encryption key, wherein the computer program product comprises a computer readable storage medium having program instructions embodied therewith, the program instructions executable by a processor of the data storage device to cause processor operations, the processor operations comprising:
  issuing a prepare for enable command to request a first encryption key from the encryption key server;
  in association with the prepare for enable command, transitioning state machine logic from an unconfigured state to a prepare for enable state;
  in association with the prepare for enable state:
    upon receiving the requested first encryption key, storing the received first encryption key and transitioning state machine logic from the prepare for enable state to an enabling state; and
  in association with the enabling state:
    enablement logic attempting to retrieve a mirror copy of the first encryption key from another key server to confirm successful mirroring of the first encryption key to another key server, and upon successful retrieval of at least one mirror copy of the first encryption key from another key server, activating the first encryption key to become an activated encryption key, enabling data encryption using the activated first encryption key, and causing state machine logic to transition from the enabling state to an enabled state in which encryption of data using the activated encryption key has been enabled so that encryption of data using the activated first encryption key is enabled in response to a combination of receipt of the first encryption key from one encryption key server and retrieval of the mirror copy of the first encryption key from another key server.

2. The computer program product of claim 1 wherein the enablement logic attempting to retrieve a mirror copy of the encryption key from another key server includes periodically polling another key server upon expiration of a polling period, to confirm successful mirroring of the encryption key to the key server being polled.

3. The computer program product of claim 2 further comprising receiving a human activated enable command and in response to receiving the human activated enable command, initiating polling another key server to confirm successful mirroring of the encryption key to the key server being polled independently of expiration of a polling period.

4. The computer program product of claim 1 wherein the processor operations further comprise the state machine logic transitioning the state machine logic back to the unconfigured state upon failure to receive a requested encryption key.

5. The computer program product of claim 1 wherein the processor operations further comprise:
issuing a prepare for rekey command to obtain a second encryption key from an encryption key server;
in association with the prepare for rekey command, transitioning state machine logic from the enabled state to a prepare for rekey state;
in association with the prepare for rekey state:
upon receiving a requested second encryption key, storing the received second encryption key and transitioning state machine logic from the prepare for rekey state to a rekeying state; and
in association with the rekeying state:
enablement logic attempting to retrieve a mirror copy of the second encryption key from another key server to confirm successful mirroring of the second encryption key to another key server, and upon successful retrieval of at least one mirror copy of the second encryption key from another key server, activating the second encryption key to become an activated second encryption key, enabling data encryption using the activated second encryption key, and causing state machine logic to transition from the rekeying state to the enabled state in which encryption of data using the activated second encryption key has been enabled.

6. The computer program product of claim 5 wherein the enablement logic attempting to retrieve a mirror copy of the second encryption key from another key server includes periodically polling another key server upon expiration of a polling period, to confirm successful mirroring of the second encryption key to the key server being polled.

7. The computer program product of claim 6 further comprising receiving a human activated rekey command and in response to receiving the human activated rekey command, initiating polling another key server to confirm successful mirroring of the second encryption key to the key server being polled independently of expiration of a polling period.

8. The computer program product of claim 5 wherein the processor operations further comprise the state machine logic transitioning the state machine logic back to the enabled state in which encryption of data using the activated encryption key has been enabled, but in which encryption of data using the second encryption key is not enabled upon failure to receive a requested second encryption key.

9. A system, comprising:
a data storage device having a processor and a computer program product; and
an encryption key server and another key server, each configured to store an encryption key;
wherein the computer program product comprises a computer readable storage medium having program instructions embodied therewith, the program instructions executable by the processor of the data storage device to cause processor operations, the processor operations comprising:
issuing a prepare for enable command to request a first encryption key from the encryption key server;
in association with the prepare for enable command, transitioning state machine logic from an unconfigured state to a prepare for enable state;
in association with the prepare for enable state:
upon receiving the requested first encryption key, storing the received first encryption key and transitioning state machine logic from the prepare for enable state to an enabling state; and
in association with the enabling state:
enablement logic attempting to retrieve a mirror copy of the first encryption key from another key server to confirm successful mirroring of the first encryption key to another key server, and upon successful retrieval of at least one mirror copy of the first encryption key from another key server, activating the first encryption key to become an activated encryption key, enabling data encryption using the activated first encryption key, and causing state machine logic to transition from the enabling state to an enabled state in which encryption of data using the activated encryption key has been enabled so that encryption of data using the activated first encryption key is enabled in response to a combination of receipt of the first encryption key from one encryption key server and retrieval of the mirror copy of the first encryption key from another key server.

10. The system of claim 9 wherein the enablement logic attempting to retrieve a mirror copy of the encryption key from another key server includes periodically polling another key server upon expiration of a polling period, to confirm successful mirroring of the encryption key to the key server being polled.

11. The system of claim 10 wherein the processor operations further comprise receiving a human activated enable command and in response to receiving the human activated enable command, initiating polling another key server to confirm successful mirroring of the encryption key to the key server being polled independently of expiration of a polling period.

12. The system of claim 9 wherein the processor operations further comprise the state machine logic transitioning the state machine logic back to the unconfigured state upon failure to receive a requested encryption key.

13. The system of claim 9 wherein the processor operations further comprise:
issuing a prepare for rekey command to obtain a second encryption key from an encryption key server;
in association with the prepare for rekey command, transitioning state machine logic from the enabled state to a prepare for rekey state;

in association with the prepare for rekey state:
   upon receiving a requested second encryption key, storing the received second encryption key and transitioning state machine logic from the prepare for rekey state to a rekeying state; and
in association with the rekeying state:
   enablement logic attempting to retrieve a mirror copy of the second encryption key from another key server to confirm successful mirroring of the second encryption key to another key server, and upon successful retrieval of at least one mirror copy of the second encryption key from another key server, activating the second encryption key to become an activated second encryption key, enabling data encryption using the activated second encryption key, and causing state machine logic to transition from the rekeying state to the enabled state in which encryption of data using the activated second encryption key has been enabled.

14. The system of claim 13 wherein the enablement logic attempting to retrieve a mirror copy of the second encryption key from another key server includes periodically polling another key server upon expiration of a polling period, to confirm successful mirroring of the second encryption key to the key server being polled.

15. The system of claim 14 further comprising receiving a human activated rekey command and in response to receiving the human activated rekey command, initiating polling another key server to confirm successful mirroring of the second encryption key to the key server being polled independently of expiration of a polling period.

16. The system of claim 13 wherein the processor operations further comprise the state machine logic transitioning the state machine logic back to the enabled state in which encryption of data using the activated encryption key has been enabled, but in which encryption of data using the second encryption key is not enabled upon failure to receive a requested second encryption key.

17. A method comprising:
   processor operations of a data storage device for use with an encryption key server and another key server, each configured to store an encryption key, the processor operations comprising:
      issuing a prepare for enable command to request a first encryption key from the encryption key server;
      in association with the prepare for enable command, transitioning state machine logic from an unconfigured state to a prepare for enable state;
      in association with the prepare for enable state:
         upon receiving the requested first encryption key, storing the received first encryption key and transitioning state machine logic from the prepare for enable state to an enabling state; and
      in association with the enabling state:
         enablement logic attempting to retrieve a mirror copy of the first encryption key from another key server to confirm successful mirroring of the first encryption key to another key server, and upon successful retrieval of at least one mirror copy of the first encryption key from another key server, activating the first encryption key to become an activated encryption key, enabling data encryption using the activated encryption key, and causing state machine logic to transition from the enabling state to an enabled state in which encryption of data using the activated first encryption key has been enabled so that encryption of data using the activated first encryption key is enabled in response to a combination of receipt of the first encryption key from one encryption key server and retrieval of the mirror copy of the first encryption key from another key server.

18. The method of claim 17 wherein the enablement logic attempting to retrieve a mirror copy of the encryption key from another key server includes periodically polling another key server upon expiration of a polling period, to confirm successful mirroring of the encryption key to the key server being polled.

19. The method of claim 18 further comprising receiving a human activated enable command and in response to receiving the human activated enable command, initiating polling another key server to confirm successful mirroring of the encryption key to the key server being polled independently of expiration of a polling period.

20. The method of claim 17 wherein the processor operations further comprise the state machine logic transitioning the state machine logic back to the unconfigured state upon failure to receive a requested encryption key.

21. The method of claim 17 wherein the processor operations further comprise:
   issuing a prepare for rekey command to obtain a second encryption key from an encryption key server;
   in association with the prepare for rekey command, transitioning state machine logic from the enabled state to a prepare for rekey state;
   in association with the prepare for rekey state:
      upon receiving a requested second encryption key, storing the received second encryption key and transitioning state machine logic from the prepare for rekey state to a rekeying state; and
   in association with the rekeying state:
      enablement logic attempting to retrieve a mirror copy of the second encryption key from another key server to confirm successful mirroring of the second encryption key to another key server, and upon successful retrieval of at least one mirror copy of the second encryption key from another key server, activating the second encryption key to become an activated second encryption key, enabling data encryption using the activated second encryption key, and causing state machine logic to transition from the rekeying state to the enabled state in which encryption of data using the activated second encryption key has been enabled.

22. The method of claim 21 wherein the enablement logic attempting to retrieve a mirror copy of the second encryption key from another key server includes periodically polling another key server upon expiration of a polling period, to confirm successful mirroring of the second encryption key to the key server being polled.

23. The method of claim 22 further comprising receiving a human activated rekey command and in response to receiving the human activated rekey command, initiating polling another key server to confirm successful mirroring of the second encryption key to the key server being polled independently of expiration of a polling period.

24. The method of claim 21 wherein the processor operations further comprise the state machine logic transitioning the state machine logic back to the enabled state in which encryption of data using the activated encryption key has been enabled, but in which encryption of data using the second encryption key is not enabled upon failure to receive a requested second encryption key.

\* \* \* \* \*